US011186245B2

(12) United States Patent
Kadam et al.

(10) Patent No.: US 11,186,245 B2
(45) Date of Patent: Nov. 30, 2021

(54) SEAT WITH AIRBAG

(71) Applicant: Ford Global Technologies, LLC, Dearborn, MI (US)

(72) Inventors: Mangesh Kadam, Canton, MI (US); Srinivas Reddy Malapati, Novi, MI (US); Yuqin Zhao, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 256 days.

(21) Appl. No.: 16/508,439

(22) Filed: Jul. 11, 2019

(65) Prior Publication Data

US 2021/0009067 A1    Jan. 14, 2021

(51) Int. Cl.
| | |
|---|---|
| *B60R 21/207* | (2006.01) |
| *B60R 21/2338* | (2011.01) |
| *B60R 21/231* | (2011.01) |
| *B60R 21/239* | (2006.01) |
| *B60R 21/233* | (2006.01) |
| *B60R 21/26* | (2011.01) |
| *B60R 21/02* | (2006.01) |

(52) U.S. Cl.
CPC .......... *B60R 21/207* (2013.01); *B60R 21/233* (2013.01); *B60R 21/239* (2013.01); *B60R 21/2338* (2013.01); *B60R 21/23184* (2013.01); *B60R 21/26* (2013.01); *B60R 2021/0273* (2013.01); *B60R 2021/2395* (2013.01); *B60R 2021/23146* (2013.01)

(58) Field of Classification Search
CPC ................ B60R 21/207; B60R 21/233; B60R 2021/23146
See application file for complete search history.

(56) References Cited

U.S. PATENT DOCUMENTS

| | | | | |
|---|---|---|---|---|
| 6,315,245 | B1 | 11/2001 | Ruff | |
| 9,573,553 | B2* | 2/2017 | Ko | B60R 21/207 |
| 9,919,673 | B2* | 3/2018 | Ohno | B60R 21/262 |
| 9,950,687 | B2* | 4/2018 | Kato | B60R 21/207 |
| 10,071,702 | B2* | 9/2018 | Ohno | B60R 21/264 |
| 10,202,095 | B2* | 2/2019 | Ohno | B60R 21/261 |
| 10,315,606 | B2* | 6/2019 | Ohno | B60R 21/207 |
| 10,328,889 | B2* | 6/2019 | Sugie | B60R 21/233 |
| 10,336,284 | B2* | 7/2019 | Dry | B60R 21/2334 |
| 10,471,920 | B2* | 11/2019 | Dry | B60R 21/233 |
| 10,625,704 | B2* | 4/2020 | Dry | B60R 21/233 |
| 10,632,958 | B2* | 4/2020 | Dry | B60N 2/14 |
| 10,899,307 | B2* | 1/2021 | Lin | B60N 2/806 |

(Continued)

FOREIGN PATENT DOCUMENTS

| | | |
|---|---|---|
| DE | 10258245 A1 | 6/2004 |
| FR | 2133239 A5 * 11/1972 | B60R 21/16 |

(Continued)

*Primary Examiner* — Paul N Dickson
*Assistant Examiner* — Joselynn Y Sliteris
(74) *Attorney, Agent, or Firm* — Frank A. MacKenzie; Bejin Bieneman PLC (57) ABSTRACT

A seat including a seatback having a top and two sides extending downwardly from the top and an airbag supported by the top and the two sides of the seatback and including a tube inflatable forward and downward from the top. The airbag defining at least one inflation chamber in fluid communication with the tube. The inflation chamber extending from at least one side of the seatback towards the tube.

20 Claims, 9 Drawing Sheets

(56) References Cited

U.S. PATENT DOCUMENTS

| | | | |
|---|---|---|---|
| 10,946,826 B2* | 3/2021 | Jaradi | B60R 21/264 |
| 2013/0015642 A1 | 1/2013 | Islam et al. | |
| 2017/0291569 A1 | 10/2017 | Sugie et al. | |
| 2019/0016293 A1* | 1/2019 | Saso | B60R 21/207 |
| 2019/0031132 A1 | 1/2019 | Dry et al. | |
| 2019/0054884 A1* | 2/2019 | Dry | B60R 21/2338 |
| 2019/0071046 A1 | 3/2019 | Dry et al. | |
| 2020/0391690 A1* | 12/2020 | Faruque | B60R 21/2338 |
| 2021/0061211 A1* | 3/2021 | Jung | B60R 21/216 |

FOREIGN PATENT DOCUMENTS

| | | | | |
|---|---|---|---|---|
| JP | 2011178188 A | * | 9/2011 | |
| JP | 2017030638 A | * | 2/2017 | |
| WO | WO-2007099667 A1 | * | 9/2007 | B60R 21/233 |
| WO | 2018114723 A1 | | 6/2018 | |
| WO | WO-2019244767 A1 | * | 12/2019 | B60N 2/427 |

* cited by examiner

SEAT WITH AIRBAG

BACKGROUND

During a vehicle impact, occupants may move in a direction influenced by the momentum of the vehicle along with a principal direction of impact force. The seating configuration inside a vehicle cabin will influence the kinematics of the occupants.

DETAILED DESCRIPTION

A seat includes a seatback having a top and two sides extending downwardly from the top. The seat includes an airbag supported by the top and the two sides of the seatback and including a tube inflatable forward and downward from the top. The airbag defining at least one inflation chamber in fluid communication with the tube. The inflation chamber extending from at least one side of the seatback towards the tube.

The tube may include a plurality of holes spaced from each other along the tube. The tube may be in fluid communication with at least one inflation chamber through the holes.

The tube may be disposed in the inflation chamber.

The tube may be external to at least one inflation chamber.

The seat may include an inflator in fluid communication with the tube.

The seat may include a second tube spaced from the tube. The second tube may be in fluid communication with at least one inflation chamber and inflatable forward and downward from the top of the seatback.

The tube and the second tube may each include a plurality of holes spaced from each other along the respective tube. The tubes may in fluid communication with at least one inflation chamber through the holes.

The tubes may be disposed in the inflation chamber.

The tubes may be external to at least one inflation chamber.

The tubes may partially define one inflation chamber therebetween. The inflation chamber may be in fluid communication with at least one tube.

The seat may include two inflators. One inflator may be in fluid communication with each tube.

The airbag, in an inflated position, may be configured to extend from the seatback around a lower leg of an occupant seated against the seatback.

The seat may include a reinforcement having a first leg fixed to the top of the seatback and a second leg pivotally coupled to the first leg. The airbag may extend from the first leg to the second leg.

The reinforcement may define a radial inflation path for the airbag. The path may be centered at a location where the second leg is pivotally coupled to the first leg.

The second leg, in an inflated position, may be configured to extend around a lower leg of an occupant seated in the seat.

The tube may extend from the first leg to the second leg of the reinforcement.

The airbag may include a plurality of internal reinforcements each fixed to the airbag in the inflation chamber.

The airbag may include a plurality of tethers each extending across the inflation chamber.

The airbag may include a plurality of seams defining chambers therebetween.

At least one of the seams may include at least one vent extending into adjacent chambers. Adjacent chambers may be in fluid communication through the respective vent.

With reference to the Figures, wherein like numerals indicate like parts throughout the several views, a vehicle 10 is generally shown. The vehicle 10 includes a seat 12 having a seatback 14. The seatback 14 includes a top 16 and two sides 18 extending downwardly from the top 16. An airbag 20 is supported by the top 16 and the two sides 18 of the seatback 14 and includes a tube 22 inflatable forward and downward from the top 16. The airbag 20 defines at least one inflation chamber 24 in fluid communication with the tube 22. The inflation chamber 24 extends from at least one side 18 of the seatback 14 towards the tube 22.

Figure 1:
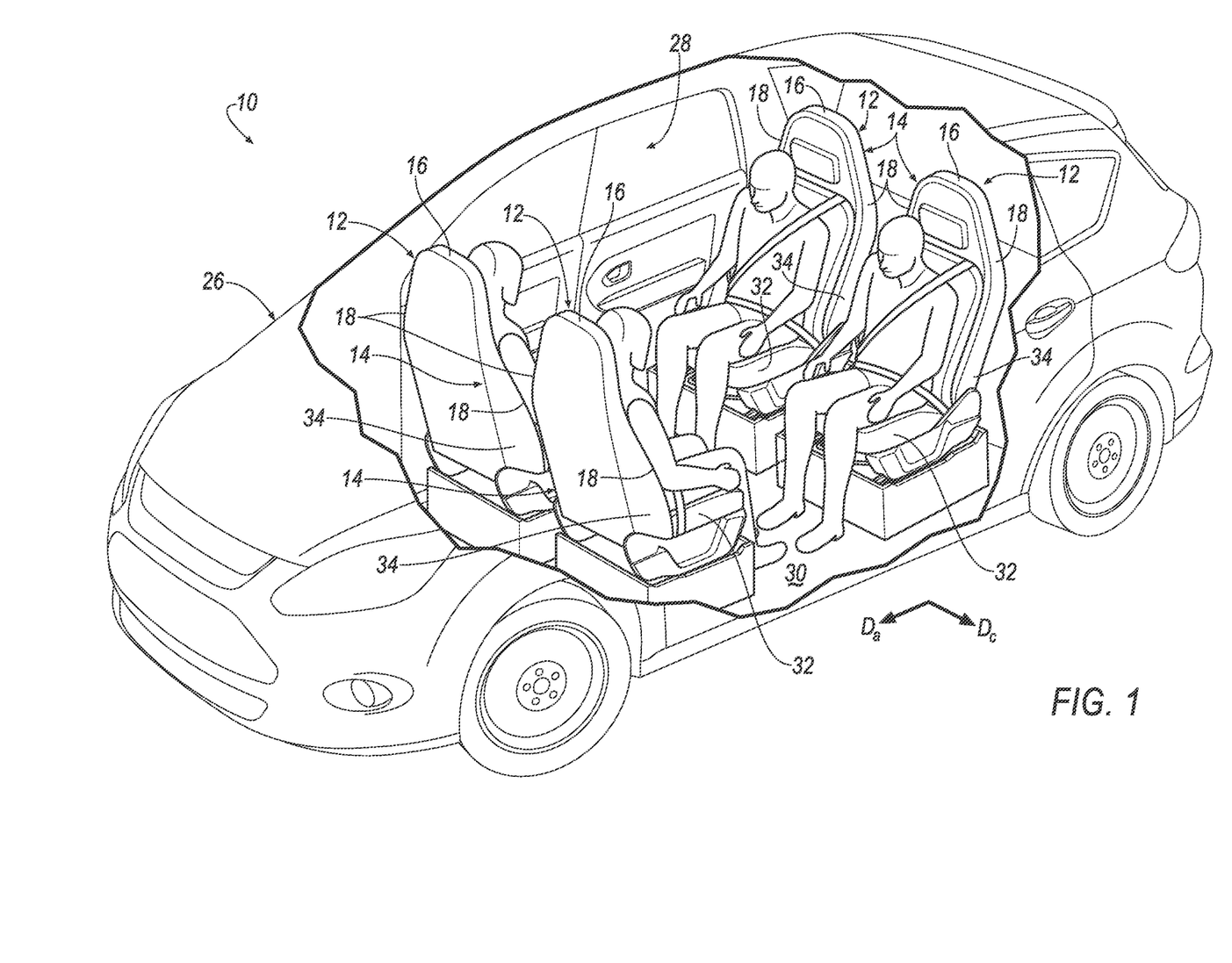
FIG. 1 is a perspective view of an example vehicle with a passenger cabin exposed for illustration.
Figure 2:
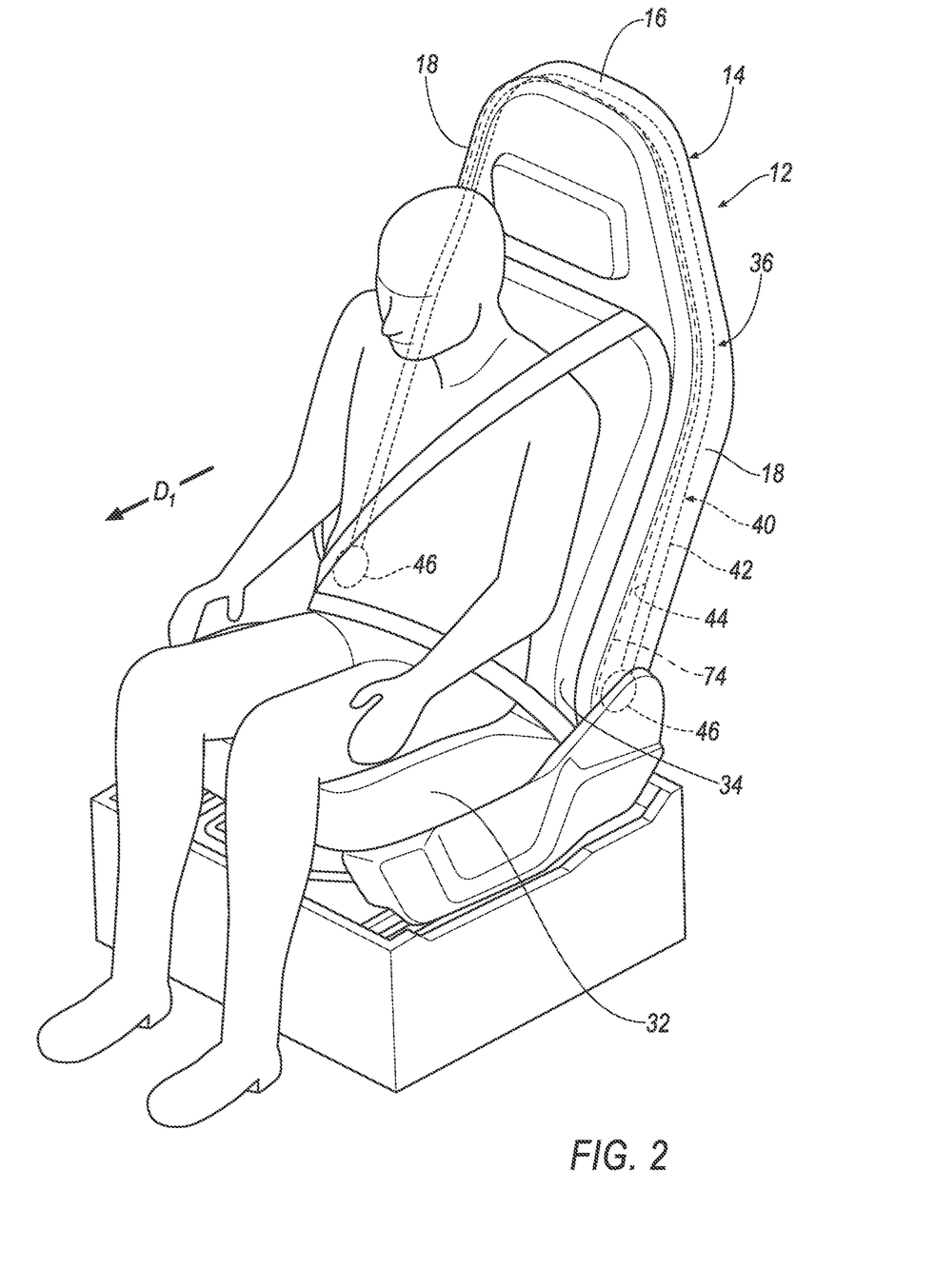
FIG. 2 is a perspective view of a seat of the vehicle of FIG. 1.
Figure 3:
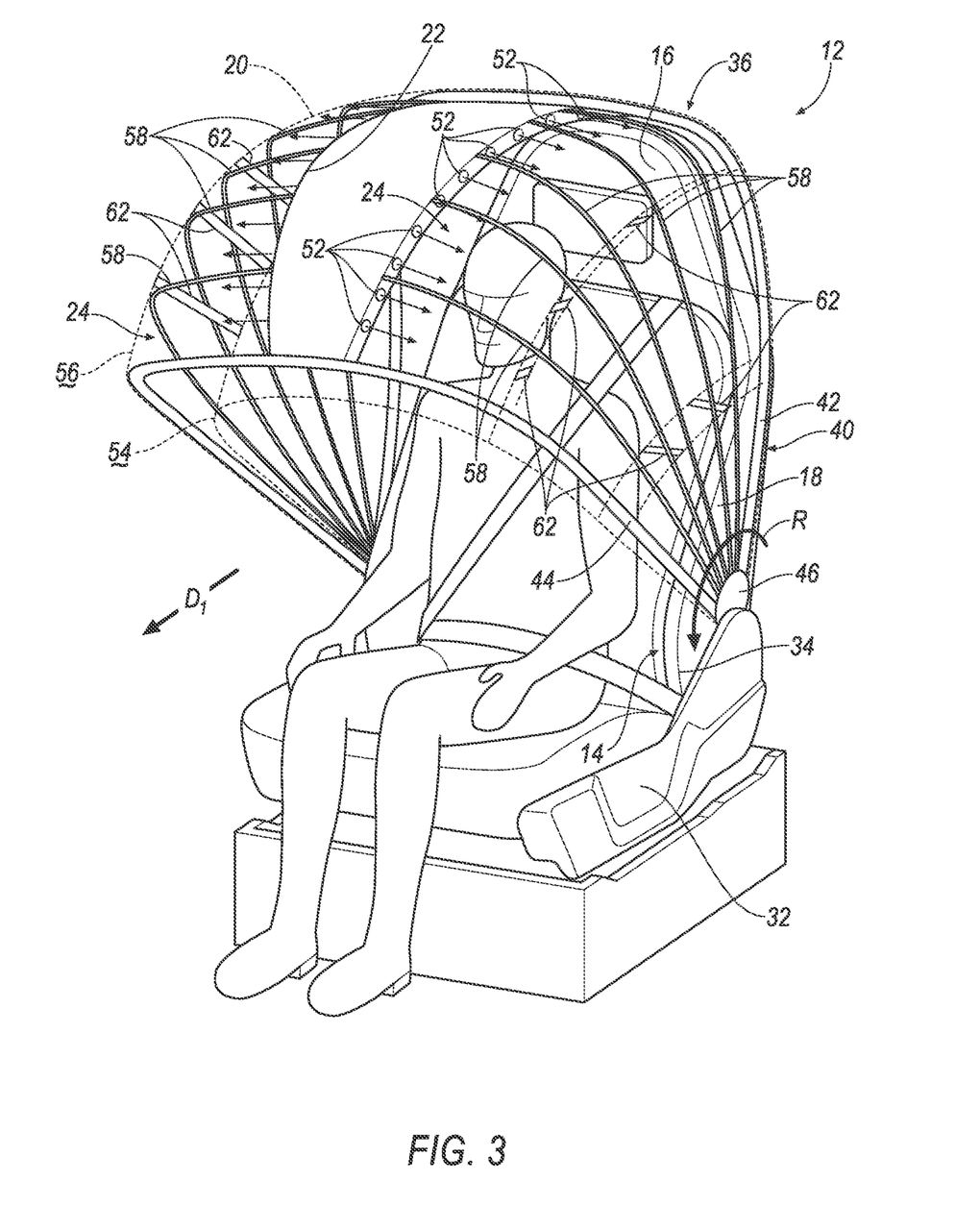
FIG. 3 is a perspective view of the seat of FIG. 2 including an airbag in a partially inflated position and having a tube disposed in an inflation chamber.
Figure 4A:
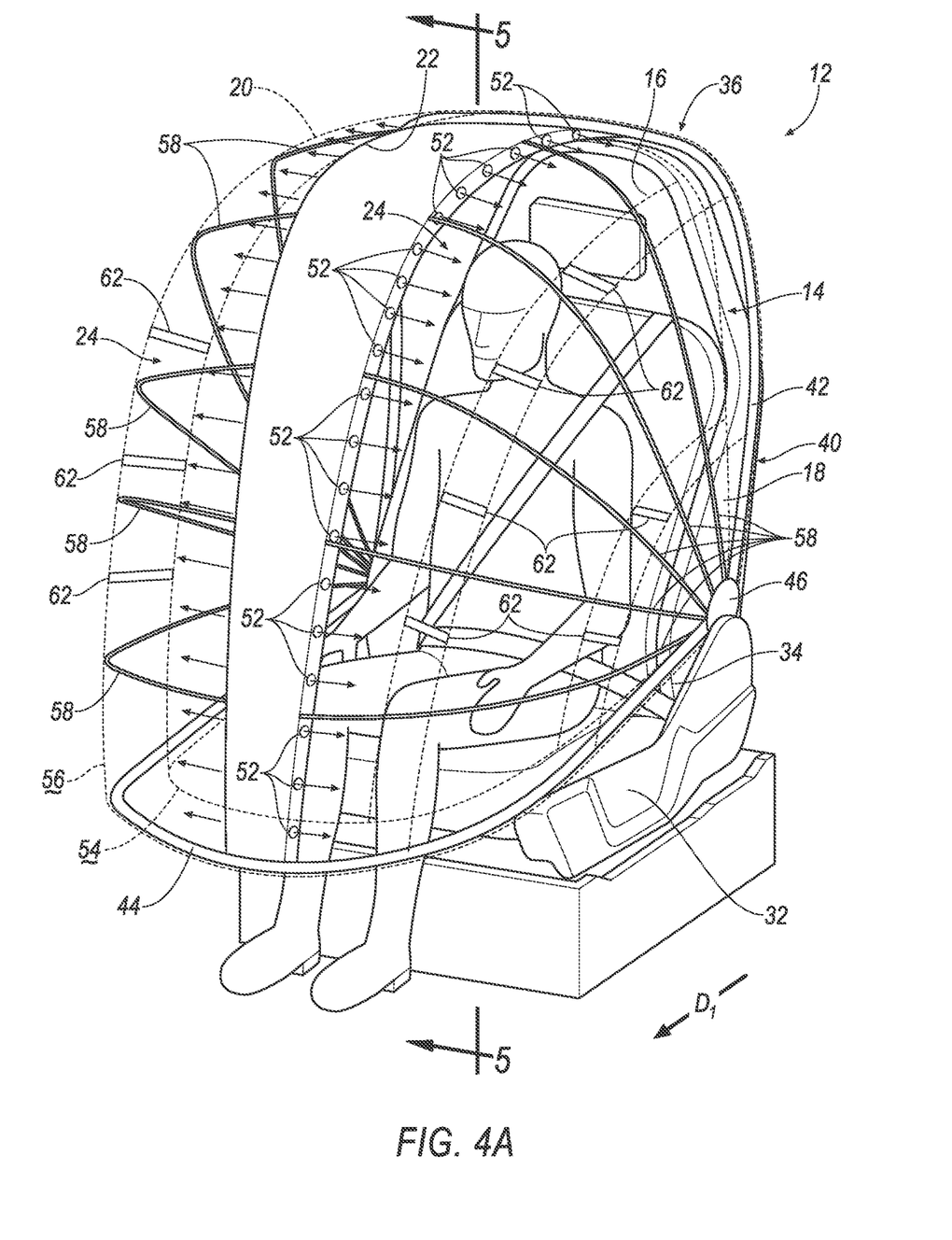
FIG. 4A is a perspective view of the seat of FIG. 2 including the airbag in an inflated position and having wire reinforcements disposed in the inflation chamber.
Figure 4B:
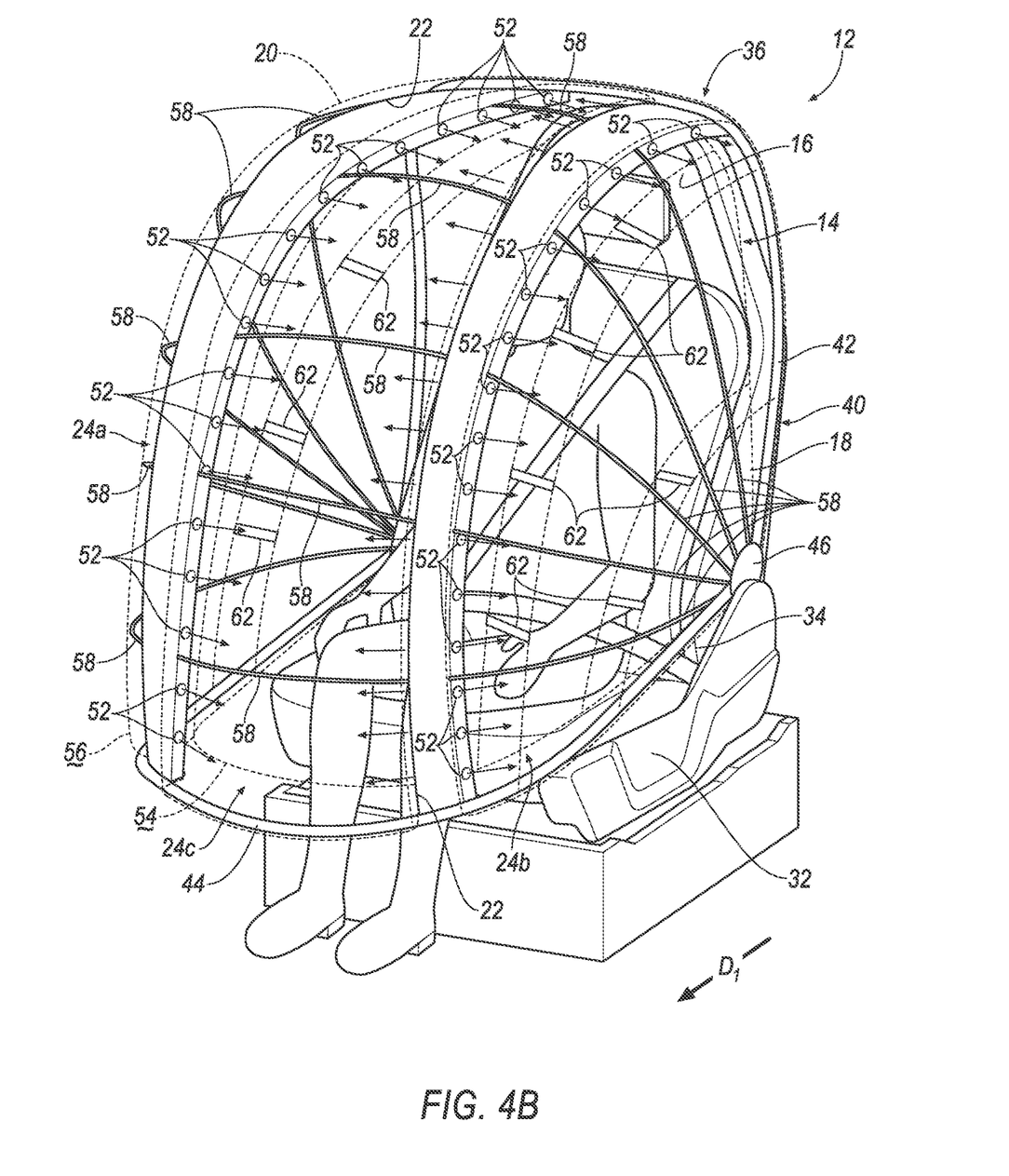
FIG. 4B is a perspective view of the seat of FIG. 2 including the airbag in the inflated position and having two tubes each partially defining at least one inflation chamber.
Figure 4C:
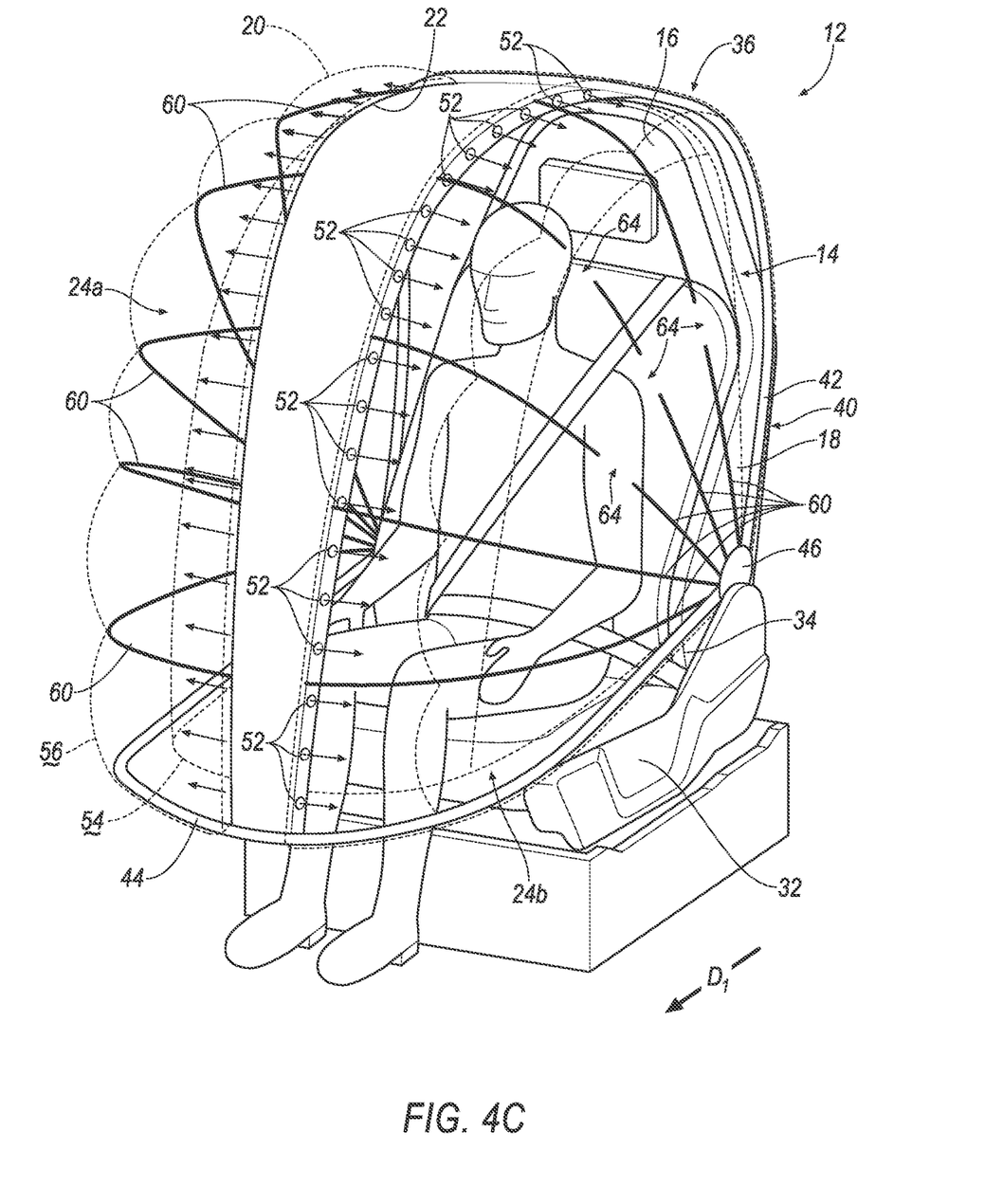
FIG. 4C is a perspective view of the seat of FIG. 2 including the airbag in the inflated position and having a plurality of seams defining a plurality of chambers therebetween.
Figure 5:
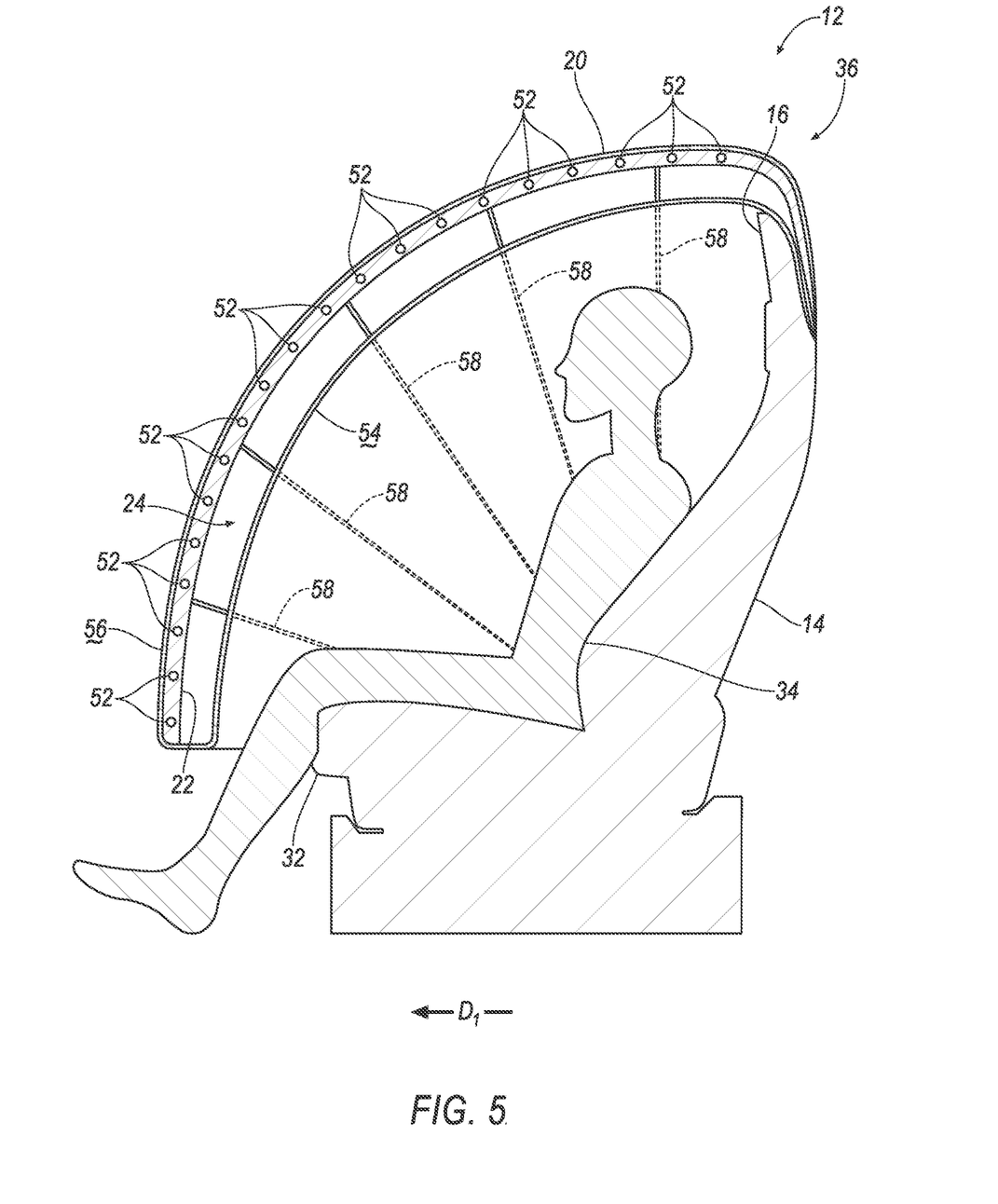
FIG. 5 is a cross-sectional view of the seat of FIG. 4A.
Figure 5A:
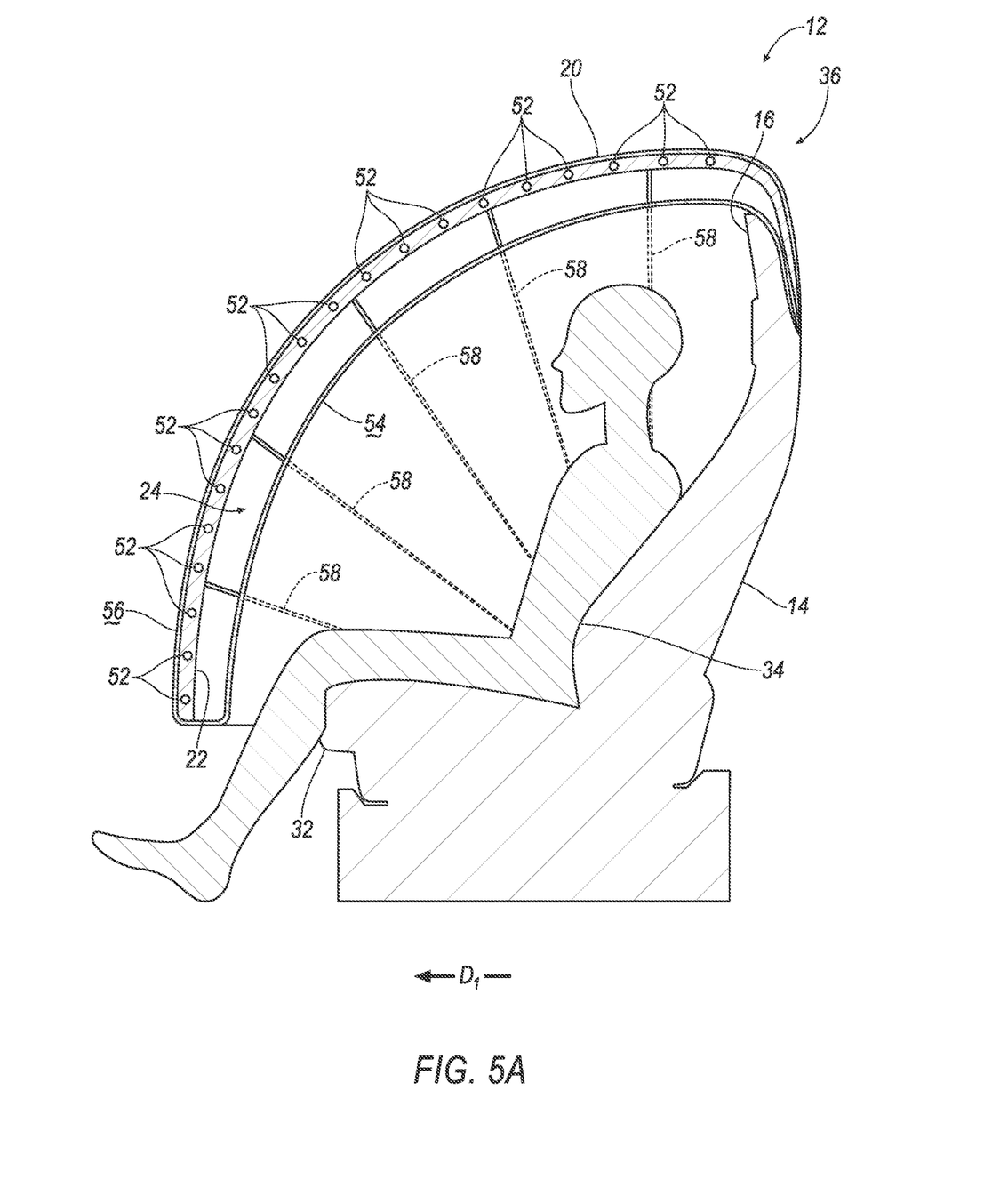

During a vehicle impact, the airbag 20 may be inflated from an uninflated position, as shown in FIGS. 1-2, to an inflated position, as shown in FIGS. 3-5. During the vehicle impact, an occupant may be forced into the airbag 20 in the inflated position. In the inflated position, the airbag 20 surrounds the occupant, as described further below. During the vehicle impact, the airbag 20 may provide coverage so as to control the kinematics of the occupant. By surrounding the occupant of the seat 12, the airbag 20 may increase the likelihood that the airbag 20 provides coverage to control the kinematics of the occupant regardless of the direction of the impact and the direction the seat 12 faces.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 may include two sides (not numbered) spaced from each other in the cross-vehicle direction Dc. The sides of the vehicle 10 may be elongated in the vehicle fore-and-aft direction Da. Each side of the vehicle 10 may be similar or identical to each other.

With reference to FIG. 1, the vehicle 10 may include a body 26 defining a passenger cabin 28 to house occupants, if any, of the vehicle 10. The passenger cabin 28 may extend across the vehicle 10, i.e., from one side to the other side of the vehicle 10. The passenger cabin 28 includes a front end (not numbered) and a rear end (not numbered) with the front end being in front of the rear end during forward movement of the vehicle 10. The passenger cabin 28 includes one or more seats 12. The seats 12 may be arranged in any suitable arrangement. For example, one or more of the seats 12 may be at the front end of the passenger cabin 28, i.e., a front seat, and/or one or more of the seats 12 may be at the rear end of the passenger cabin 28, i.e., a rear seat.

With continued reference to FIG. 1, the body 26 includes a floor 30. The floor 30 may define the lower boundary of the passenger cabin 28 and may extend from the front end of the passenger cabin 28 to the rear end of the passenger cabin 28.

With reference to the Figures, each seat 12 may include the seatback 14 and a seat bottom 32. The seatback 14 may be supported by the seat bottom 32 and may be stationary or movable relative to the seat bottom 32. The seatback 14 and the seat bottom 32 may be adjustable in multiple degrees of freedom. Specifically, the seatback 14 and the seat bottom 32 may themselves be adjustable, in other words, adjustable components within the seatback 14 and/or the seat bottom 32 may be adjustable relative to each other.

As shown in the Figures, the seatback 14 may include a bottom 34 adjacent to the seat bottom 32. The bottom 34 of the seatback 14 is spaced from the top 16 of the seatback 14. The top 16 may be adjacent to a head restraint. For example, as shown in the Figures, the top 16 may be above the head restraint, i.e., spaced farther from the bottom 34 than the head restraint. As another example, the top 16 of the seatback 14 may support the head restraint, i.e., be disposed between the head restraint and the seat bottom 32.

With reference to FIG. 2, each seat 12 may define a seat-forward direction D1. The seat-forward direction D1 extends forward relative to the seat 12. For example, the seat-forward direction D1 may extend from a rear of the seat 12 to a front of the seat 12 relative to an occupant of the seat 12, i.e., the occupant of the seat 12 faces in the seat-forward direction D1. As another example, the seat bottom 32 may extend from the seatback 14 in the seat-forward direction D1.

The seat 12 may include a seat frame (not shown) and a covering (not numbered) supported on the seat frame. The seat frame may include tubes, beams, etc. The seat frame may support cushions in the seatback 14 and/or seat bottom 32. The seat frame may be any suitable plastic material, e.g., carbon fiber reinforced plastic (CFRP), glass fiber-reinforced semi-finished thermoplastic composite (organosheet), etc. As another example, some or all components of the seat frame may be any suitable metal, e.g., steel, aluminum, etc.

The covering of the seat 12 may include upholstery and padding. The upholstery may be cloth, leather, faux leather, or any other suitable material. The upholstery may be stitched in panels around the seat frame. The padding may be between the covering and the seat frame and may be foam or any other suitable material. The covering may include a class-A surface.

With reference to FIG. 2, the seatback 14, e.g., the covering, may include a tear seam 74. The tear seam 74 may be disposed on the seatback 14. For example, the tear seam 74 may extend along the top 16 of the seatback 14 and along the two sides 18 of the seatback 14 from the top 16 towards the bottom 34 of the seatback 14. The tear seam 74 may, for example, be disposed adjacent to the airbag 20. Said differently, the airbag 20 may extend through the tear seam 74 in the inflated position. The tear seam 74 may have any suitable shape. For example, the tear seam 74 may have a linear shape, i.e., extending in a line along the seatback 14.

The tear seam 74 may be designed to tear apart when subjected to a tensile force above a threshold magnitude. In other words, the covering on one side of the tear seam 74 separates from the covering on the other side of the tear seam 74 when the force is above the threshold magnitude. The threshold magnitude may be chosen to be greater than forces from, e.g., inadvertent pushing against the seatback 14 by an occupant but be less than forces from the deployment of the airbag 20. The tear seam 74 may be, for example, a line of perforations through the covering, a line of thinner covering material than the rest of the covering, etc.

With reference to FIG. 2, the two sides 18 of the seatback 14 are spaced from each other, e.g., in the cross-vehicle direction Dc. The seatback 14 may terminate at the sides 18. A backrest (not numbered) may extend from the one side 18 to the other side 18. The sides 18 may extend from the backrest in a direction that an occupant of the seat 12 would face, that is, in the seat-forward direction D1. The sides 18 may extend along the seatback 14 in an upward direction as defined by the seat 12. For example, the sides 18 may extend from the bottom 34 towards the top 16 of the seatback 14. The sides 18 may support an occupant laterally relative to the seat 12.

Each seat 12 is supported by the floor 30, as shown in FIG. 1. The orientation of the seats 12 relative to the floor 30, i.e., the direction of the seat-forward direction D1, may be adjustable by an occupant. Each seat 12 may be rotatable relative to the floor 30. For example, each seat 12 may be supported by a pivotable base (not shown) supported by the floor 30. Each seat 12 may pivot about an axis (not numbered). The axis may extend through the floor 30 and the seat bottom 32. In other words, the seat 12 is rotatable to face in different directions. For example, two seats 12 in FIG. 1 are facing forwardly and the other two seats 12 in FIG. 1 are facing rearwardly. The seat 12 may rotate completely, i.e. 360° about the axis. The seat 12 may rotate to face any number of directions. In addition to being rotatable to move the seat-forward direction D1, each seat 12 may slide relative to the floor 30, e.g., in the vehicle fore-and-aft direction Da. In such an example, the seat 12 may be supported on a seat track (not shown) to allow the seat 12 to move in the vehicle fore-and-aft direction Da. As another example, each seat 12 may, for example, be fixed relative to the floor 30. In this situation, the seat 12 may be immovable relative to the floor 30.

The vehicle 10 may include an airbag assembly 36, which includes the airbag 20 and an inflator 38. The seatback 14 may support the airbag assembly 36, and specifically, may support the airbag 20 when the airbag 20 is in the inflated position. The airbag assembly 36 may be mounted to the seatback 14, as set forth below. The vehicle 10 may include any suitable number of airbag assemblies 36. For example, the vehicle 10 may include one airbag assembly 36 for each seat 12.

The airbag 20 is supported by the seatback 14 of one seat 12, as shown in FIG. 2. For example, the airbag assembly 36 may be fixed to the seat frame. The airbag 20 may, for example, be disposed in the seatback 14 in the uninflated position, e.g., between the covering and the seat frame. In other words, the covering may cover the airbag 20 in the uninflated position. In the inflated position, the airbag 20 may extend through seatback 14, i.e., the tear seam 74. In this situation, the airbag 20 may extend outwardly from the seatback 14.

With reference to FIGS. 2-4C, the airbag assembly 36 may include a reinforcement 40 attached to the seatback 14 and supporting the airbag 20. The reinforcement 40 may include a first leg 42 and a second leg 44 pivotally coupled to the first leg 42. For example, the reinforcement 40 may include a hinge 46 disposed on each side 18 of the seatback 14. The hinges 46 may be disposed closer to the bottom 34 of the seatback 14 than the top 16 of the seatback 14. In other words, the hinges 46 may be disposed closer to the seat bottom 32 than a head restraint. The hinges 46 may, for example, be fixed to the seat frame. The reinforcement 40 may be any suitable material, e.g., metal, plastic, etc.

The first leg 42 extends from one hinge 46 to the other hinge 46 along the two sides 18 and the top 16 of the seatback 14, as shown in FIGS. 2-4C. The first leg 42 is fixed to the top 16 of the seatback 14, e.g., the seat frame. The first leg 42 may be fixed to the top 16 of the seatback 14 in any suitable manner, e.g., fasteners, adhesive, welding, etc. The first leg 42 may have any suitable shape, e.g., arch, semi-spherical, etc.

The second leg 44 is pivotable relative to the first leg 42 from a first position, as shown in FIG. 2, to a second position as shown in FIGS. 4A-4C. The second leg 44 is in the first position when the airbag 20 is in the uninflated position. The second leg 44 is in the second position when the airbag 20 is in the inflated position. In the first position, the second leg 44 extends from one hinge 46 to the other hinge 46 along the two sides 18 and the top 16 of the seatback 14. In other words, the second leg 44 may extend substantially parallel to the first leg 42. In this situation, both the first leg 42 and the second leg 44 may be covered by the covering of the seatback 14. The second leg 44 has a same shape as the first leg 42.

In the second position, the second leg 44 extends through the covering of the seatback 14. Said differently, the second leg 44 extends transverse to the first leg 42 in the second position. In this situation, the second leg 44 extends outwardly from the seatback 14, e.g., generally in the seat-forward direction D1. In the second position, the seat bottom 32 is disposed between a portion of the second leg 44 and the seatback 14 in the seat-forward direction D1. Additionally, the second leg 44 may be disposed between the floor 30 and a top surface of the seat bottom 32. For example, the second leg 44 may be configured to extend around a lower leg of an occupant seated against the seatback 14, i.e., sitting in the seat 12, as shown in FIGS. 4A-5. The lower leg is the portion of the leg between an ankle and a knee. The lower leg of the occupant may be any suitable size, i.e., height and weight. For example, the lower leg may have the same size as any suitable test dummy specified by a standards-setting body, e.g., a government agency such as the National Highway Traffic Safety Administration (NHTSA).

The second leg 44 may define a radial inflation path R for the airbag 20. The radial inflation path R is centered around the hinges 46, i.e., where the second leg 44 is pivotally coupled to the first leg 42. As the airbag 20 unfurls between the uninflated position and the inflated position, the second leg 44 pivots away from the first leg 42, i.e., the seatback 14, about the hinges 46, as shown in FIG. 3. The radial inflation path R extends from the seatback 14 in the seat-forward direction D1 and towards the floor 30.

The airbag 20 may be formed of any suitable type of material, e.g., from a woven polymer. For example, the airbag 20 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 20 may be a single continuous unit, e.g., a single piece of fabric. Alternatively, the airbag 20 may include a plurality of segments, i.e., two or more. The segments may be attached to each other in any suitable fashion, e.g., a plurality of panels attached by stitching, ultrasonic welding, etc.

The airbag 20 extends from the first leg 42 to the second leg 44 of the reinforcement 40. The airbag 20 may be fixed to the first leg 42 and the second leg 44 in any suitable manner, e.g., stitching, ultrasonic welding, etc. The airbag 20 extends along the first leg 42 and the second leg 44 from one hinge 46 to the other hinge 46.

The airbag 20 may include an inner panel 54 and an outer panel 56 spaced from each other and defining the inflation chamber 24 therebetween, as shown in FIGS. 3-5. The inner panel 54 faces the backrest of the seatback 14 in the inflated position, i.e., the occupant of the seat 12. The outer panel 56 may extend around the inner panel 54. In other words, the outer panel 56 may surround the inner panel 54. The outer panel 56 faces away from the seatback 14 in the inflated position. During inflation, the inner panel 54 may, for example, move away from the outer panel 56, e.g., towards the occupant, such that the inner panel 54 is spaced farther from the outer panel 56 in the inflated position as compared to the uninflated position. The inner panel 54 is positioned to receive and be impacted by the occupant when the airbag 20 is inflated during an impact that urges the occupant towards the airbag 20. Said differently, the inner panel 54 may be referred to as "an impact panel."

The tube 22 is supported by the top 16 of the seatback 14, as set forth above. The tube 22 may be disposed at any suitable location along the top 16 of the seatback 14. For example, the tube 22 may be disposed between the sides 18 of the seatback 14. Alternatively, the tube 22 may extend from one side 18 of the seatback 14 towards the other side 18. The tube 22 may extend any suitable amount across the top 16 of the seatback 14. The tube 22 may extend from the first leg 42 to the second leg 44 of the reinforcement 40.

The tube 22 is inflatable from the uninflated position to the inflated position. In the uninflated position, the tube 22 may be covered by the covering. The tube 22 is in fluid communication with the inflator 38. During inflation, the tube 22 inflates forward and downward from the top 16 of the seatback 14, as set forth above. In this situation, the tube 22 may push the second leg 44 of the reinforcement 40 along the radial inflation path R to the inflated position, as shown in FIG. 3. Said differently, the second leg 44 of the reinforcement 40 may be moveable from the first position to the second position by the tube 22. In the inflated position, the tube 22 extends in the seat-forward direction D1 and from the top 16 of the seatback 14 towards the floor 30. In other words, the tube 22 curves downwardly from the top 16 of the seatback 14 in front of the seatback 14 in the inflated position. Said differently, the tube 22 may be concave relative to the seatback 14 in the inflated position. The tube 22 may be any suitable material. The tube 22 may be a same or different material as the airbag 20.

The airbag 20 may include any suitable number of tubes 22 and inflation chambers 24. Said differently, the airbag 20 may include any suitable combination of tubes 22 and inflation chambers 24. For example, the airbag 20 may include one tube 22 and one inflation chamber 24, as shown in FIGS. 3 and 4A. In this situation, the tube 22 may be disposed substantially equidistant from each side 18 of the seatback 14, e.g., in the cross-vehicle direction Dc. Additionally, the inflation chamber 24 may extend from each side 18 of the seatback 14 around the tube 22. In other words, the tube 22 may be disposed in the inflation chamber 24, as shown in FIG. 5. As another example, the airbag 20 may include one tube 22 and two inflation chambers 24a, 24b, as shown in FIG. 4C. In this situation, the tube 22 partially defines each inflation chamber 24a, 24b. In other words, the tube 22 is external to the inflation chambers 24a, 24b. In such an example, the inflation chambers 24a, 24b may extend from the respective side 18 of the seatback 14 to the tube 22. As yet another example, the airbag 20 may include two tubes 22 spaced from each other, e.g., in the cross-vehicle direction Dc, and three inflation chambers 24a, 24b, 24c, as shown in FIG. 4B. In this situation, each tube 22 partially defines one respective inflation chamber 24a and 24b extending from one respective side 18 of the seatback 14 to the respective tube 22. Additionally, the tubes 22 partially define one inflation chamber 24c extending from one tube 22 to the other tube 22. In other words, each tube 22 is external to the inflation chambers 24a, 24b, 24c. In such an example, the inflation chambers 24a, 24b each extend from the respective side 18 of the seatback 14 to the respective tube 22, and the intermediate inflation chamber 24c extends from one tube 22 to the other tube 22. In such an example, the intermediate inflation chamber 24c is in fluid communication with at least one tube 22.

The tube 22 may include a plurality of holes 52 facing at least one inflation chamber, as shown in FIGS. 3-5. The holes 52 may be spaced from each other along the tube 22. For example, the holes 52 may be spaced from each other from the first leg 42 to the second leg 44 along the radial inflation path R. The tube 22 may include any suitable number of holes 52. The holes 52 may be any suitable size, e.g., diameter, perimeter, etc., and shape, e.g., circle, rectangle, etc. The holes 52 allow fluid communication between the tube 22 and the inflation chamber 24. For example, inflation medium flows from the tube 22 into the inflation chamber 24 through the holes 52.

The airbag 20 may, for example, include a plurality of internal reinforcements 58, as shown in FIGS. 3-4B. The plurality of internal reinforcements 58 may assist in maintaining the shape of the airbag 20 during inflation and/or in the inflated position. Alternatively, the airbag 20 may include a plurality of seams 60, as shown in FIG. 4C, to assist in maintaining the shape of the airbag 20.

With reference to FIGS. 3-4B, the plurality of internal reinforcements 58 are disposed in the inflation chamber 24. The internal reinforcements 58 may, for example, be elongated along the outer panel 56 transverse to the radial inflation path R. For example, the internal reinforcements 58 may be elongated partially along the outer panel 56. In such an example, the internal reinforcements 58 may be elongated along the outer panel 56 to the tube 22, as shown in FIGS. 4A and 4B. As another example, the internal reinforcements 58 may be elongated from one side 18 of the seatback 14 to the other side 18 of the seatback 14 along the outer panel 56, i.e., around the tube 22. The internal reinforcements 58 may be fixed to the outer panel 56 in any suitable manner, e.g., stitching, ultrasonic welding, etc. The internal reinforcements 58 may be any suitable material, e.g., metal, plastic, etc. The internal reinforcements 58 may have any suitable size, e.g., diameter, perimeter, etc.

The internal reinforcements 58 may be spaced from each other along the radial inflation path R. Said differently, the internal reinforcements 58 may be radially spaced from each other when the airbag 20 is in the inflated position. The internal reinforcements 58 may have substantially a same shape as the first leg 42 and the second leg 44 of the reinforcement 40. The internal reinforcements 58 may assist in maintaining the shape of the airbag 20 in the inflated position. The airbag 20 may include any suitable number of internal reinforcements 58, e.g., one or more.

With continued reference to FIGS. 3-4B, the airbag 20 may include a plurality of tethers 62 disposed in the inflation chamber 24. The tethers 62 may extend across the inflation chamber 24, i.e., from the inner panel 54 to the outer panel 56. In other words, the tethers 62 may extend transverse to the internal reinforcements 58. The tethers 62 may be fixed to the inner panel 54 and the outer panel 56. The airbag 20 may include any suitable number of tethers 62. The tethers 62 may be any suitable material. For example, the tethers 62 may be a same material as the airbag 20. The tethers 62 may be fixed to the airbag 20, e.g., the inner panel 54 and the outer panel 56, in any suitable manner, e.g., stitching, ultrasonic welding, etc.

With reference to FIG. 4C, the inner panel 54 is attached to the outer panel 56 along the seams 60. The seams 60 may attach the inner panel 54 to the outer panel 56 in any suitable manner, e.g., stitching, ultrasonic welding, etc. The seams 60 may, for example, be elongated along the outer panel 56 transverse to the radial inflation path R, e.g., towards the tube 22.

The seams 60 may be spaced from each other along the airbag 20 from the first leg 42 to the second leg 44 of the reinforcement 40 when the airbag 20 is in the inflated position. Said differently, the seams 60 may be radially spaced from each other when the airbag 20 is in the inflated position. In this situation, the adjacent seams 60 may define a chamber (not numbered) therebetween. In such an example, the airbag 20 may include a plurality of chambers extending, e.g., radially, from the first leg 42 to the second leg 44 of the reinforcement 40. Each chamber may be in fluid communication with the tube 22, i.e., through one or more holes 52. The seams 60 may assist in maintaining the shape of the airbag 20 in the inflated position.

One or more of the seams 60 may include one or more vents 64. The vents 64 are a portion along the seam 60 where the inner panel 54 is spaced from the outer panel 56. In other words, the inner panel 54 and the outer panel 56 are disconnected at the vents 64. The vents 64 may be any suitable size, i.e., extend any suitable length along the seam 60. The vents 64 may be spaced from each other along the seam 60 when the seam 60 includes a plurality of vents 64. The vents 64 may be disposed at any suitable position on the seam 60. The vents 64 allow fluid communication between adjacent chambers. In other words, inflation medium flows between adjacent chambers through the vents 64 to control the inflation of each chamber.

The inflator 38 is in fluid communication with the airbag 20, and specifically the tube 22. The inflator 38 expands the airbag 20 with inflation medium, such as a gas, to move the airbag 20 from the uninflated position to the inflated position. The inflator 38 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 38 may be supported by any suitable vehicle component, e.g., the seatback 14, the seat bottom 32, etc.

The airbag assembly 36 may include any suitable number of inflators 38. For example, the airbag assembly 36 may include one inflator 38 regardless of the number of tubes 22. As another example, the airbag assembly 36 may include the same number of inflators 38 as tubes 22, i.e., one respective inflator 38 in fluid communication with each tube 22.

Figure 6:
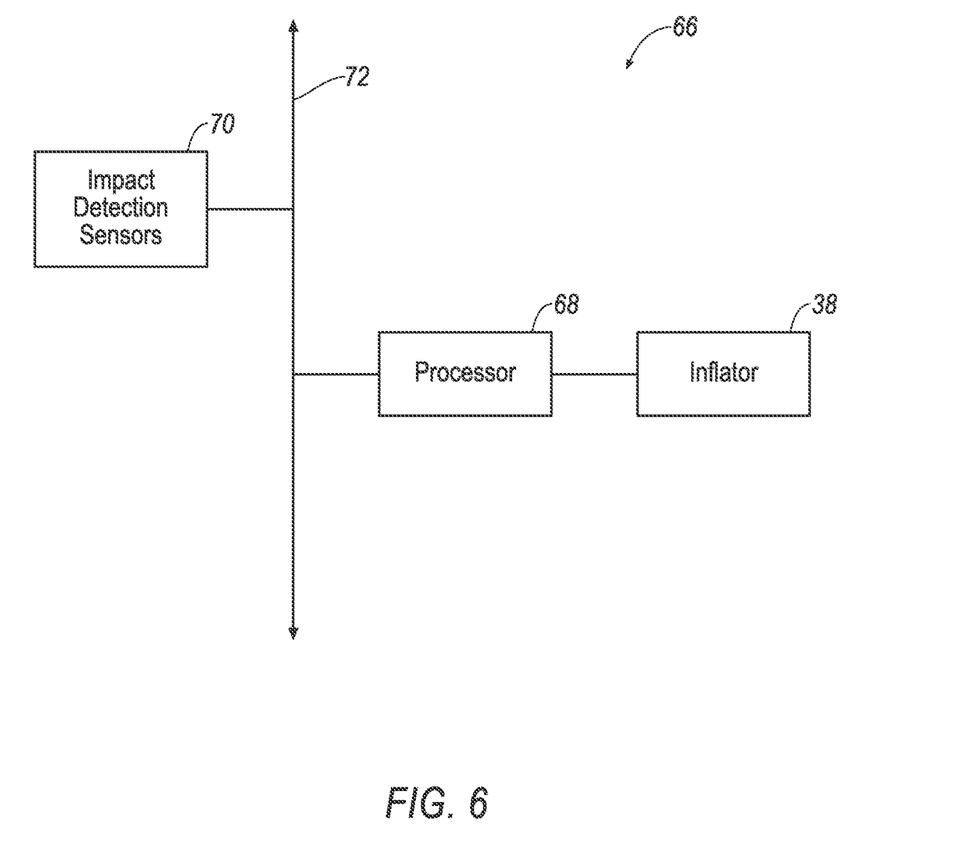
FIG. 6 is a block diagram of an inflation system of the vehicle.

With reference to FIG. 6, the vehicle 10 may include an inflation system 66 having a computer. The computer may be a microprocessor-based computing device implemented via circuits, chips, or other electronic components. For example, the computer may include a processor 68, memory, etc. The memory may store instructions executable by the processor 68 and the processor 68 may read the instructions from the memory and execute the instructions. The processor 68 may be programmed to initiate an inflation of the airbag 20 in response to the vehicle impact.

The vehicle 10 may include impact detection sensors 70 programmed to detect the vehicle impact to the vehicle 10. The impact detection sensors 70 may be disposed in the vehicle 10. The impact detection sensors 70 may be of various types, e.g., pressure sensor, acceleration sensor, vision sensor, etc. When the vehicle impact occurs, the processor 68 may receive one or more signals from the impact detection sensors 70 indicating the vehicle impact. In response to receiving the signals from the impact detection sensors 70, the processor 68 may initiate the inflation of the airbag 20. Alternatively, the processor 68 may initiate the inflation of the airbag 20 selectively based on information from the impact detection sensors 70 identifying the physical characteristics of the vehicle impact, e.g., which side of the vehicle 10 impacted, amount of pressure applied to the vehicle 10, etc. and also seat occupancy information, e.g., by using the occupancy sensors disposed inside the seats 12 sensing the occupancy status of the seats 12.

In order to receive the signals from the sensors, e.g., the impact detection sensors 70, and to initiate the inflation of the airbag 20, the processor 68 communicates with the sensors, e.g., the impact detection sensors 70, and the inflator 38, e.g., through a direct electrical wiring, through which an analog or a digital signal is transmitted, or through a communication network 72 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 20 is in the uninflated position, under normal operating conditions of the vehicle 10. In the event of a vehicle impact, the impact detection sensors 70 detect the impact. The impact detection sensors 70 transmit a signal indicating the vehicle impact collision through the communication network 72 to the computer. When the vehicle impact is detected, the computer transmits a signal through the communication network 72 triggering the inflator 38 to inflate the airbag 20 with inflation medium from the uninflated position to the inflated position. When the inflator 38 inflates the airbag 20 to the inflated position, the inflation medium flows into the tube 22, increasing the pressure in the tube 22. As the pressure is increased in the tube 22, the tube 22 extends away from the seatback 14 and inflation medium flows from the tube 22 into the inflation chamber 24 via the plurality of holes 52. Specifically, the airbag 20 inflates along the radial inflation path R in front of and around the occupant. As the occupant moves relative to the seatback 14 due to momentum of the vehicle impact, the occupant moves towards the airbag 20. When the occupant impacts the airbag 20, the airbag 20 controls the kinematics of the occupant. By extending around and in front of the occupant, the airbag 20 controls the kinematics of the occupant regardless of the direction of the vehicle impact or the direction the seat 12 faces.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first," "second," "third," "fourth," "fifth," and "sixth" are used throughout this document as identifiers and are not intended to signify importance or order. Many modifications and variations of the present disclosure are possible in light of the above teachings, and the disclosure may be practiced otherwise than as specifically described.

What is claimed is:

1. A seat comprising:
   a seatback having a top and two sides extending downwardly from the top;
   an airbag supported by the top and the two sides of the seatback and including a tube inflatable forward and downward from the top;
   the airbag defining at least one inflation chamber in fluid communication with the tube, the tube being adjacent to the at least one inflation chamber, the at least one inflation chamber extending from at least one side of the seatback towards the tube; and the tube includes a plurality of holes spaced from each other along an entire length of the tube in an inflated position from an end of the tube at the top of the seatback to an opposite end of the tube, the tube in fluid communication with the adjacent inflation chamber through the plurality of holes.

2. The seat of claim 1, wherein the tube is disposed in the inflation chamber.

3. The seat of claim 1, wherein the tube is external to at least one inflation chamber.

4. The seat of claim 1, further comprising an inflator in fluid communication with the tube.

5. The seat of claim 1, further comprising a second tube spaced from the tube, the second tube in fluid communication with at least one inflation chamber and inflatable forward and downward from the top of the seatback.

6. The seat of claim 5, wherein the tube and the second tube each include a plurality of holes spaced from each other along the respective tube, the tubes in fluid communication with at least one inflation chamber through the holes.

7. The seat of claim 5, wherein the tubes are disposed in the inflation chamber.

8. The seat of claim 5, wherein the tubes are external to at least one inflation chamber.

9. The seat of claim 8, wherein the tubes partially define one inflation chamber therebetween, the inflation chamber in fluid communication with at least one tube.

10. The seat of claim 5, further comprising two inflators, one inflator is in fluid communication with each tube.

11. The seat of claim 1, wherein the airbag, in an inflated position, is configured to extend from the seatback around a lower leg of an occupant seated against the seatback.

12. The seat of claim 1, further comprising a reinforcement having a first leg fixed to the top of the seatback and a second leg pivotally coupled to the first leg, the airbag extending from the first leg to the second leg.

13. The seat of claim 12, wherein the reinforcement defines a radial inflation path for the airbag, the path centered at a location where the second leg is pivotally coupled to the first leg.

14. The seat of claim 12, wherein the second leg, in an inflated position, is configured to extend around a lower leg of an occupant seated in the seat.

15. The seat of claim 12, wherein the tube extends from the first leg to the second leg of the reinforcement.

16. The seat of claim 1, wherein the airbag includes a plurality of internal reinforcements each fixed to the airbag in the inflation chamber.

17. The seat of claim 16, wherein the airbag includes a plurality of tethers each extending across the inflation chamber.

18. The seat of claim 1, wherein the airbag includes a plurality of seams defining chambers therebetween.

19. The seat of claim 18, wherein at least one of the seams includes at least one vent extending into adjacent chambers, adjacent chambers being in fluid communication through the respective vent.

20. A seat comprising:
a seatback having a top and two sides extending downwardly from the top;
an airbag supported by the top and the two sides of the seatback and including a tube inflatable forward and downward from the top;
the airbag defining at least one inflation chamber in fluid communication with the tube, the inflation chamber extending from at least one side of the seatback towards the tube; and
a reinforcement having a first leg fixed to the top of the seatback and a second leg pivotally coupled to the first leg, the airbag extending from the first leg to the second leg.

* * * * *